T. J. BRAY.
Collapsible-Ball for Welding Pipes.
No. 223,986.  Patented Feb. 3, 1880.
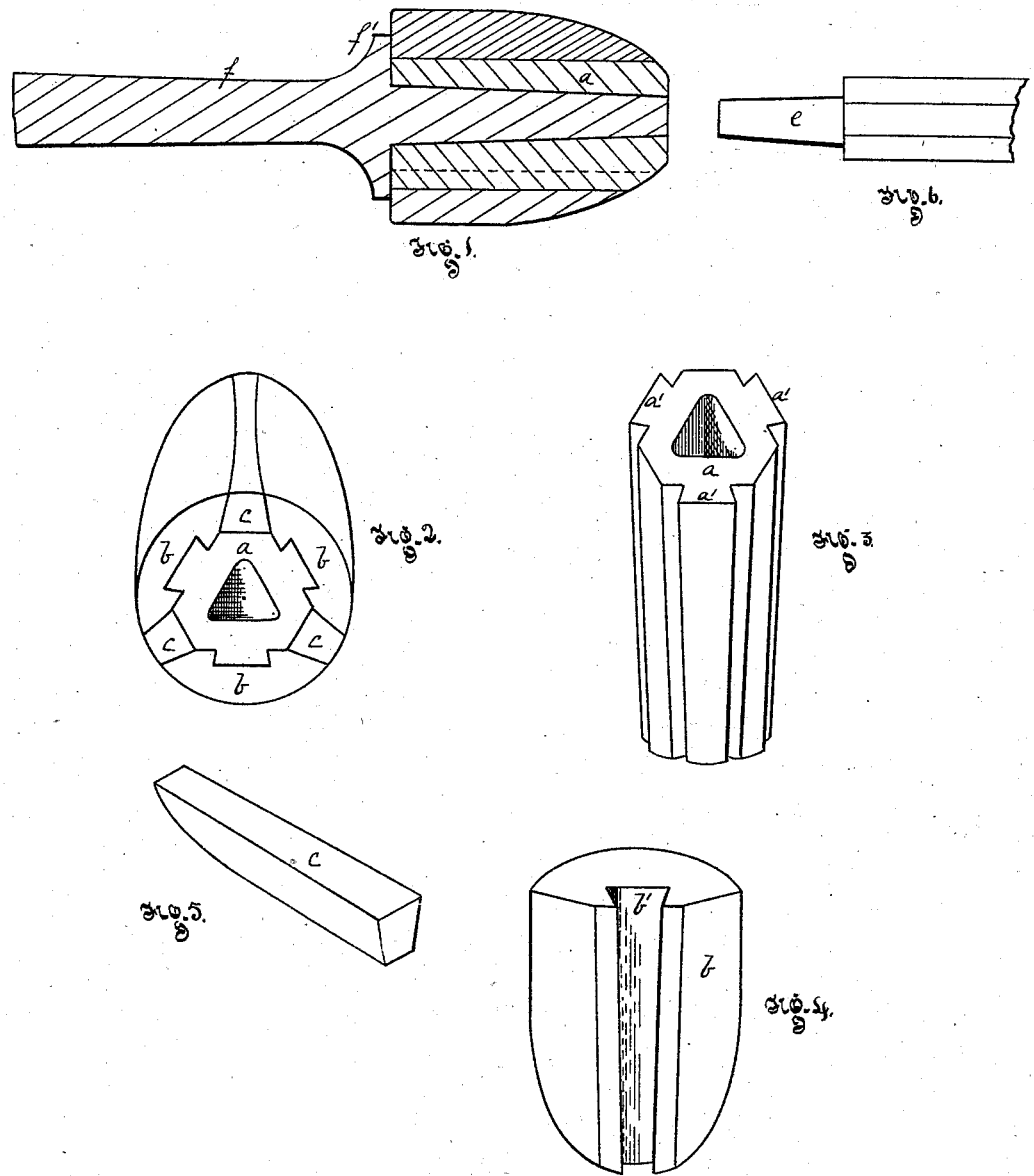

UNITED STATES PATENT OFFICE.

THOMAS J. BRAY, OF PITTSBURG, PENNSYLVANIA.

COLLAPSIBLE BALL FOR WELDING PIPE.

SPECIFICATION forming part of Letters Patent No. 223,986, dated February 3, 1880.

Application filed October 6, 1879.

*To all whom it may concern:*

Be it known that I, THOMAS J. BRAY, of Pittsburg, in the county of Allegheny and State of Pennsylvania, have invented a new and useful Improvement in Collapsible Balls for Welding Pipe; and I do hereby declare the following to be a full, clear, and exact description thereof, reference being had to the accompanying drawings, forming a part of this specification, in which—

Figure 1 is a sectional view of my improved welding ball or mandrel. Fig. 2 is a like view of the same looking at the butt-end; and Figs. 3, 4, and 5 are views of the separate parts.

Like letters of reference indicate like parts in each.

My invention relates to the construction of pipe-welding balls or mandrels; and it consists of a collapsible ball or mandrel composed of side segments or sections and key-sections mounted on a tapering central core, the several parts combined and so constructed that it may be caused to fall to pieces at any desired moment.

Heretofore in the welding of wrought-iron pipe great difficulty has been experienced with what are termed "stickers," which are simply welding-balls that stick in the pipe. The skelp, which is an unwelded tube, is first heated in the furnace and then placed in the welding-rolls, which draw it through over the ball. It frequently happens that the ball sticks in the tube. The practice then in small pipe is to withdraw the tube and mandrel off of the rod and put on another ball, and try to drive the sticker through and out of the pipe by the second ball. This frequently fails, and then the only resource is to cut the tube into short sections, taking out the piece containing the sticker. This occasions much loss, which consists chiefly in the accumulation of short and unsalable lengths of pipe. In large pipe the sticker is sometimes removed by placing the pipe under a steam-hammer and crushing it. It is then taken out with comparative ease. These stickers are more easily removed from the smaller sizes, so that the greater loss occurs in the larger and more expensive sizes. They often occasion the breaking and straining of the gearing of rolls by being drawn through them.

My improved welding-ball is so constructed that when it sticks in a pipe it can be collapsed or reduced to pieces and then removed without injuring the pipe.

In some sizes of pipe a new ball is required for each length, because the ball is so injured and cut by the cinder adhering to the iron that after welding one pipe it is not fit for further use. At the side where the weld is the passing of the seam cuts a groove in the side of the ball.

My improved ball is made up of sections, so that in case one part is cut or injured that part can be removed and a new piece inserted. Thus the same ball may be used a number of times by merely renewing the injured part.

To enable others skilled in the art to make and use my invention, I will now describe its construction and operation.

The ball is formed of a central hexagonal core or piece, *a*, three side pieces or segments, *b*, and three keys, *c*. The central piece, *a*, has three wide and three narrow sides, and in length is of tapering or wedge form. It is provided with tapering or wedge-shaped dovetails *a'* on its wide sides, which serve as the means of attachment of the side pieces or segments, *b*, which, being correspondingly grooved on the inside at *b'*, are slid onto the dovetails *a'*. The larger ends of the dovetails *a'* and grooves *b'* are at the butt-end of the ball. The keys *c* are, in cross-section, in shape like the frustum of a pyramid, and longitudinally are wedge-shaped. They are slid in between and under the edges of the side pieces, *b*.

By this construction the ball may be collapsed by knocking back the core-piece *a* by a sharp blow at the point, the keys falling in and letting the sides drop. If the keys are removed the sides may be taken off and new ones put on the core. Thus any injured or damaged part may be removed, the core and other uninjured parts remaining in use.

In case the ball sticks in a pipe it is only necessary to place the end of a bar or rod, *e*, Fig. 6, against the point of the core and strike it a sharp blow. This will displace the core and cause the ball to collapse or fall to pieces. It may then be removed with ease. The mandrel-rod is shown at *f*. It is provided with a wide flange, *f'*, which affords a bearing for the sectional ball.

It is apparent that the form and number of pieces composing the ball may be varied without departing from my invention, provided the core and key sections, one or more, are made with tapering lines.

What I claim as my invention, and desire to secure by Letters Patent, is—

A collapsible ball or mandrel for pipe-welding, composed of detachable side segments or sections and key-sections and a tapering central core exposed at its small end, so as to be struck by a punch and thereby removed, to permit the collapse of the ball, the several parts combined for operation substantially as specified.

In testimony whereof I, the said THOMAS J. BRAY, have hereunto set my hand.

THOMAS J. BRAY.

Witnesses:
 JAMES H. PORTE,
 T. B. KERR.